United States Patent [19]

Kanne, Jr. et al.

[11] 4,326,117
[45] Apr. 20, 1982

[54] WELD BRAZE TECHNIQUE

[75] Inventors: William R. Kanne, Jr., Aiken; John W. Kelker, Jr., North Augusta; Robert J. Alexander, Aiken, all of S.C.

[73] Assignee: The United States of America as represented by the United States Department of Energy, Washington, D.C.

[21] Appl. No.: 567,344

[22] Filed: Apr. 15, 1975

[51] Int. Cl.³ .......................... B23K 1/02; B23K 1/04
[52] U.S. Cl. ............................. 219/85 CM; 228/164; 228/165; 228/171
[58] Field of Search ................. 228/135, 136, , 164, 228/165, 171; 219/85 CM, 85 E, 85 M

[56] References Cited

U.S. PATENT DOCUMENTS 1,889,974  12/1932  Chamberlin ..................... 228/135
2,972,808   2/1961  Litton ......................... 228/171 X
3,600,795   8/1971  Brundin ........................ 228/135 X

OTHER PUBLICATIONS

*Brazing Manual*, Pub. American Welding Society, pp. 80; 105–107, 1963.

*Primary Examiner*—Brooks H. Hunt
*Attorney, Agent, or Firm*—James E. Denny; Dean E. Carlson; Allen F. Westerdahl

[57] ABSTRACT

High-strength metal joints are formed by a combined weld-braze technique. A hollow cylindrical metal member is forced into an undersized counterbore in another metal member with a suitable braze metal disposed along the bottom of the counterbore. Force and current applied to the members in an evacuated chamber results in the concurrent formation of the weld along the sides of the counterbore and a braze along the bottom of the counterbore in one continuous operation.

6 Claims, 4 Drawing Figures

WELD BRAZE TECHNIQUE

BACKGROUND OF THE INVENTION

This invention was made in the course of, or under, a contract with the U.S. Energy Research and Development Administration.

This invention relates to the art of joining metal members to form high-strength joints. More particularly, it relates to a method of making a resistance weld and braze joint of compatible metals and a braze metal. The method is particularly useful for making high-strength joints between small tubular members and relatively large plate members, such as for heat exchanger tube connections, connections to liquified gas storage tanks in space vehicles, and vacuum valve connections. It is also useful to provide a means for replacement connections where a high-quality, high-strength metal connection is required.

Heretofore, small diameter tubes have been attached to heavy plate members in industry using resistance welding techniques because resistance welding is easy to control and monitor as a fast, reliable production method. However, connections that are made using conventional resistance welding often leave certain flaws, i.e., internal cervices and other defects that develop a point of stress concentration. Such defects are particularly troublesome where the connection is used under high pressure or high stress conditions or in corrosive environments.

SUMMARY OF THE INVENTION

Accordingly, it is an object of the present invention to provide an improved technique of obtaining high-quality, high-strength metal-to-metal joints to eliminate sources of stress concentration. It is also an object of the invention to provide a combined weld-braze method for making high-strength metal-to-metal connections that substantially reduce weld failures due to internal flaws.

In accordance with the present invention, it has been found that, by using a combined weld-braze technique, high-strength metal joints can be obtained between a first metal member and a second metal member. The first metal member is counterbored to dimensions that will provide an interference fit with a second metal member to be joined thereto. A compatible braze metal is disposed between the bottom of the counterbore and the end of the second metal member. The second member is then placed in position to mate in interference with the counterbore of the first member in a vacuum chamber of a welding apparatus. The chamber is evacuated, force is applied and resistance weld energy is then applied. During the motion of the members, they are resistance welded. Upon contact with the braze metal, the residual heat generated in the resistance weld melts the braze metal to concurrently braze the members as part of a continuous operation. Thus the weld energy is controlled so that the energy generated serves both to provide a combined resistance weld and braze joint between the members.

It has been found that this method of forming a metal joing is particularly useful for connecting metal tubes or metal tubes to steel plates. For example, stainless steel tubes can be joined to metal plates of the same metal using a braze alloy of a metal selected from gold, gold-copper alloy, or gold-nickel alloy.

DESCRIPTION OF THE PREFERRED EMBODIMENTS

In connection with the following description of the preferred embodiments, unless otherwise stated, the term "resistance weld" is intended to embrace and include the phrase "resistance weld-braze."

Figure 1:
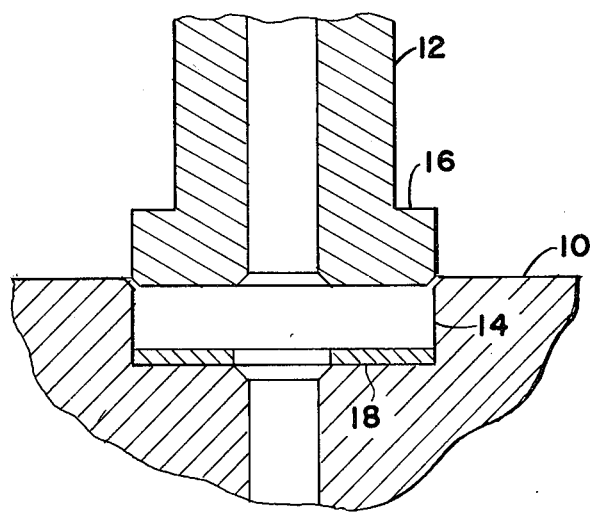
FIG. 1 is a fragmental cross section of a typical weld-braze connection prior to joining and resistance welding.
Figure 2:
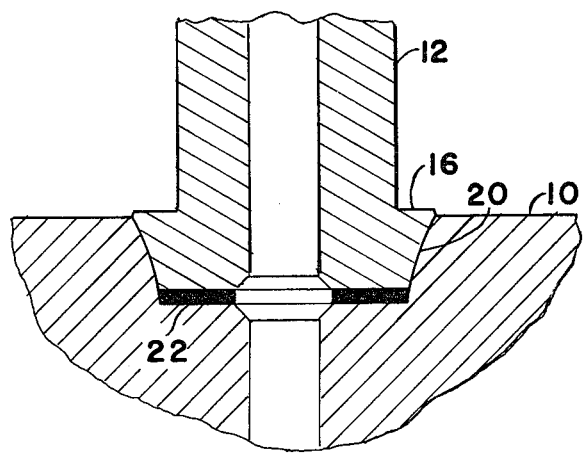
FIG. 2 shows a fragmental cross section of the connection of FIG. 1 after completion of the resistance weld-braze.
Figure 3:
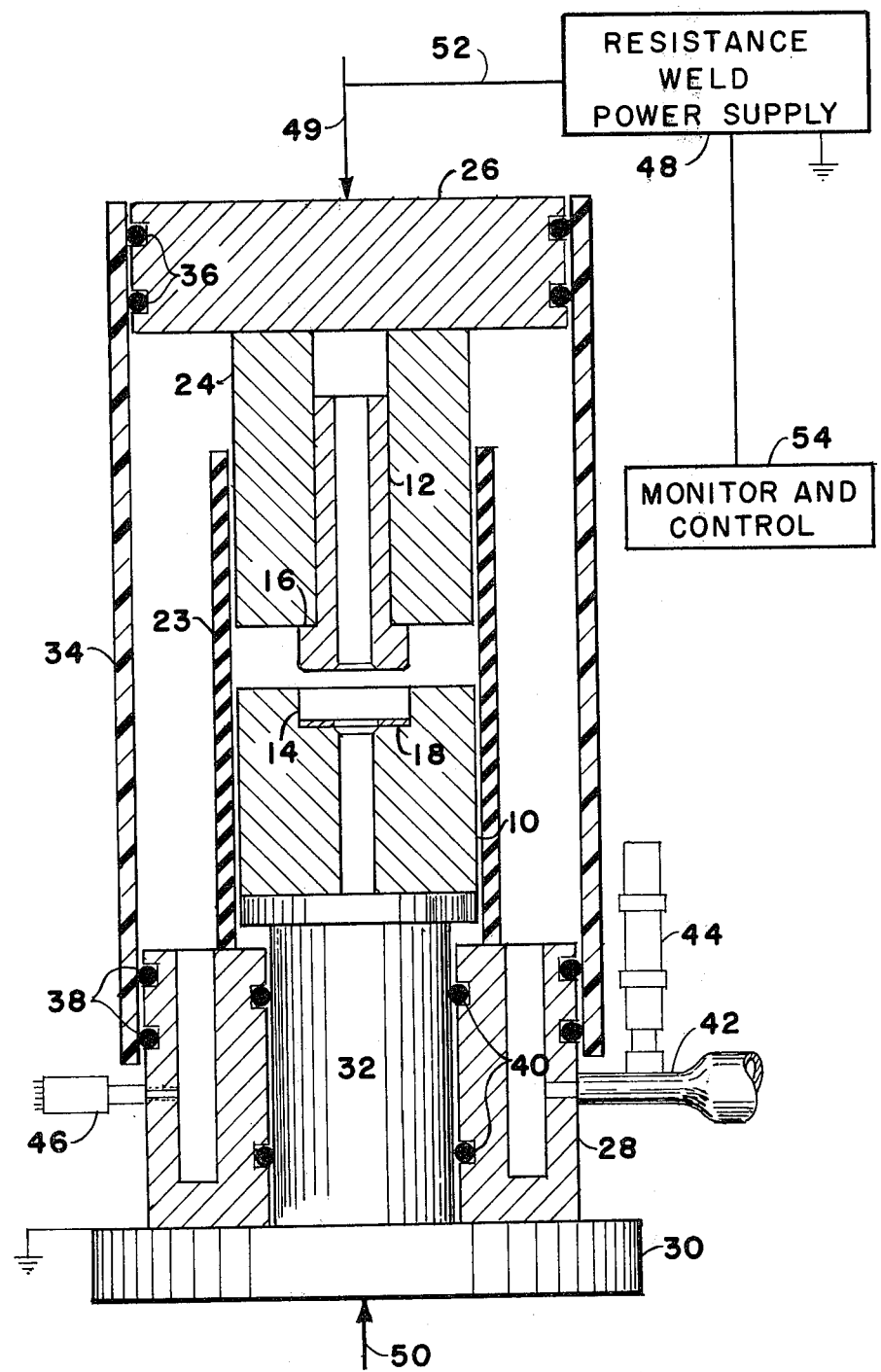
FIG. 3 is a cross sectional schematic view of one type of apparatus, including a vacuum chamber and fixtures, for performing the resistance weld-braze of the present invention.

With reference now to the exemplary preferred embodiment shown in FIGS. 1 and 2, a connection is illustrated between a plate member 10 and a tubular member 12. The plate member 10 is counterbored 14 by conventional machining techniques to provide interference fit when joined or mated with the machined shoulder 16 of the tubular member 12. A suitable compatible braze metal 18 is disposed between the end of said shoulder 16 and the bottom of said counterbore 14, either in the form of a metal washer or a layer of braze plated onto the end of said shoulder. The foregoing components are then placed in a suitable apparatus, to be described hereinafter in connection with FIG. 3, to supply the energy for the joining and resistance welding steps.

The completed weld-braze connection is illustrated in FIG. 2, wherein the plate member 10 and the tubular member 12 are shown as a high-strength joint that includes a curved area of diffusion bond weld 20 between the walls of the counterbore 14 and the shoulder 16. In addition to the diffusion bond weld 20, there is a continuous layer of braze 22 bonding the end of the tubular member 12 to the bottom of the counterbore 14. This diffusion bond weld 20 and braze 22 combine to provide an unusually high-strength joint of exceptional quality.

It will be recognized by those skilled in the welding arts that a wide variety of resistance welding apparatus can be used to perform the weld-braze herein disclosed. However, for the purpose of illustration, one type of suitable apparatus is shown schematically in FIG. 3. This apparatus comprises a welding fixture with vacuum chamber, a suitable resistance welding power supply and a means for monitoring and controlling the welding parameters. Turning now to the welding apparatus of FIG. 3, a base 30 supports a work support fixture 28 and a bottom ram 32 within vacuum chamber walls 34. Vacuum seal in the lower portion of the welding apparatus is provided by lower O-ring seals 38 and inner O-ring seals 40. The workpiece to be welded, exemplified in this figure by plate member 10 and the tubular member 12 are disposed on the bottom ram 32 while surrounded by a suitable insulating support sleeve 23. A split electrode 24 that is machined to surround the tubular member 12 and rest on shoulder 16 is inserted over the tubular member 12 within the insulating sleeve 23. An upper ram 26, that is supported by the walls of the vacuum chamber 34 and sealed with upper O-rings 36, rests on the electrode 24 in order to provide a means of linear mechanical force to the workpieces 10 and 12. To provide for the efficient flow of welding current, upper ram 26, electrode 24, lower ram 32, and base 30 are constructed of a highly conductive metal, such as copper or a copper alloy. In addition, suitable means, not shown but represented by the force arrows 49 and 50, are provided to establish the mechanical energy required, to be used in combination with the electrical energy, for the resistance weld-braze. The electrical current for the resistance weld-braze is supplied by a conventional welding power supply 48 through a conductor 52 to the upper ram 26. A suitable monitor and control means 54 monitors and controls both the electrical and physical parameters of the welding operation. The electrical parameters monitored and controlled include such conventional items as weld current, voltage, and weld time. Physical parameters, that are required to perform the weld, include the pressure applied to the upper ram 26 and the motion of the electrode during welding. The latter parameter is measured by a transducer on the ram and an inline strain cell measures the applied force. In addition, a high quality weld requires an evacuated system. In the present system, evacuation is performed by a vacuum pump 42 and the vacuum that is established is continuously monitored by a cold cathode ionization gage 44 and a thermocouple gage 46.

Figure 4:
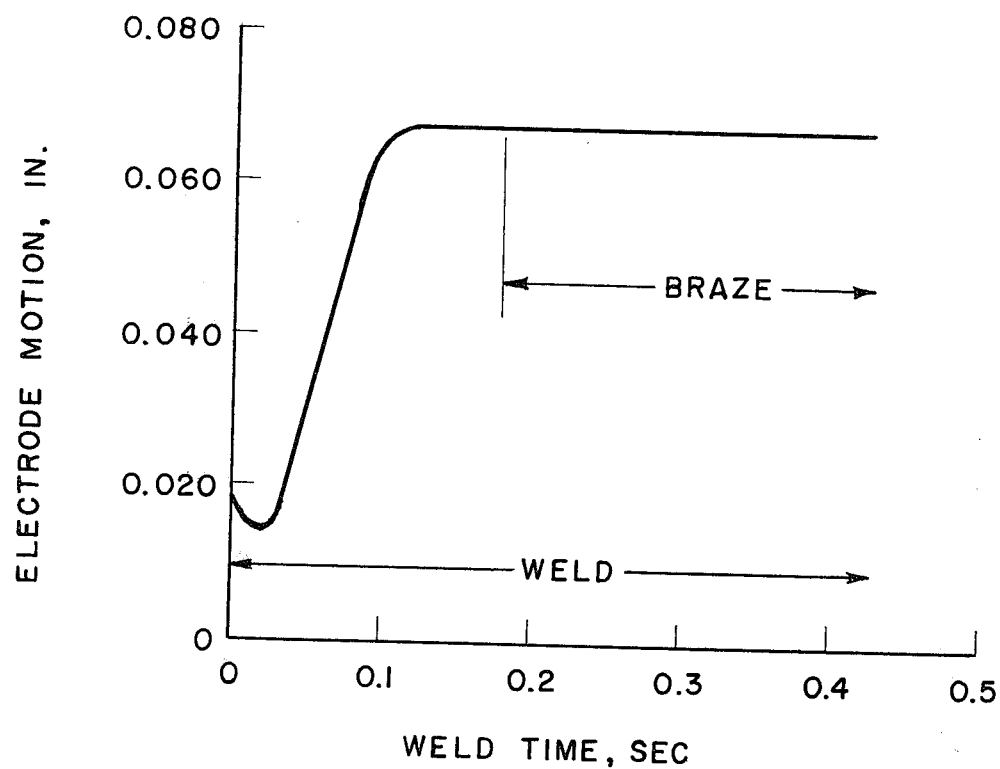
FIG. 4 is a graphic representation of electrode motion during the two phases of the resistance weld-braze.

In operation, the welding parameters are set for the particular metals to be joined in the above-described monitor and control means 54, and the shoulder 16 of tubular member 12 is positioned over the counterbore 14 of plate member 10 with the braze alloy disposed between the members as described in FIG. 1. The required pressure is applied to the rams 26 and 32 so that the shoulder 16 rests on the counterbore 14 during the initial cold setup and positioning. To facilitate the latter step, the shoulder 16 and counterbore 14 are preferably chamfered. The weld cycle is then started using the predetermined parameters. The weld cycle can best be illustrated with reference to FIG. 4 which shows an example of the electrode (ram) motion with respect to weld time. During the initial portion of the cycle, the weld bond forms progressively through the weld joint by metal upset induced by a combination of weld force and heat. The shoulder 16 seats in the counterbore 14 during the first portion of the cycle and improvement of the bond progresses across the weld interface during the second portion of the weld cycle, viz., after the shoulder 16 is seated in the counterbore 14. At this time, the weld force and heat melt the braze alloy and complete the brazing portion of the cycle. The resulting weld-braze joint has a continuous layer of braze alloy across the bottom with a curved diffusion-bonded interface along the side as shown in FIG. 2.

The metals being joined in the present illustrative embodiment are stainless steel with gold or gold alloy for the braze metal. For these materials, the weld-braze operation was completed in about one-half second and carried out in a vacuum of less than 20 microns. In joining stainless steel components, it has been found that braze metals of elemental gold, an alloy of gold with copper, or gold with nickel make a satisfactory braze. The braze metal may be in the form of a solid washer or piece or may be plated by conventional techniques to the area of the metal members being joined.

It will be apparent to those skilled in the art that different metals and braze alloys will require varying amounts of interference fit and differences in the weld-braze parameters. Also, that the weld-braze must be conducted in a vacuum or other special atmosphere. Hydrostatic tests of weld-braze of stainless steel performed in a vacuum using this technique indicate that an average weld strength of in excess of 150,000 psi can be obtained, whereas a conventional vacuum welded (resistance weld only) joint provided an average weld strength of only 80,000 psi.

We claim:

1. The method of forming a high-strength metal joint between first and second metal members which comprises:
   a. counterboring a first metal member to mate in interference fit with a hollow cylindrical metal member;
   b. disposing a compatible braze metal between the end of said hollow cylindrical member and the bottom of said counterbore;
   c. placing said hollow cylindrical metal member in position to mate in interference with the counterbore of said first metal member;
   d. disposing said members within an evacuated welding apparatus; and
   e. applying force and resistance weld energy within said apparatus to said metal members to impart relative motion thereto until contacting said braze metal so that the energy generated forms a weld between said members and concurrently brazes the end of said hollow cylindrical member into said counterbore.

2. The method of claim 1 wherein said first member is a plate and said second member is tubular.

3. The method of claim 1 wherein said braze alloy is plated onto at least one of said metal members prior to resistance welding.

4. The method of claim 1 wherein at least one of said metal members is stainless steel and said braze is selected from a group consisting of gold, gold-copper alloy, and gold-nickel alloy.

5. The method of claim 1 wherein the quality of said weld is controlled by said weld energy in the form of both heat and pressure.

6. The method of claim 1 wherein said weld is conducted in a two-phase continuous cycle to form a weld between said members along the sides of said counterbore during the first phase of said cycle and concurrently form a braze along the bottom of said counterbore during the second phase of said cycle.

* * * * *